(12) United States Patent
Herbert et al.

(10) Patent No.: US 8,438,943 B2
(45) Date of Patent: May 14, 2013

(54) DRIVER SELECT PADDLE SHIFT DEVICE AND MODES OF OPERATION

(75) Inventors: Mark D. Herbert, Dublin, OH (US); Dave Choi, Utsunomiya (JP); John Michael Schermerhorn, Columbus, OH (US); Victor Daniel Flores, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 415 days.

(21) Appl. No.: 12/962,692

(22) Filed: Dec. 8, 2010

(65) Prior Publication Data

US 2012/0144947 A1 Jun. 14, 2012

(51) Int. Cl.
*B60K 17/00* (2006.01)
*F16H 59/04* (2006.01)

(52) U.S. Cl.
USPC ............................ 74/473.31; 74/552; 180/336

(58) Field of Classification Search ................. 74/473.3, 74/472.31, 552; 180/336
See application file for complete search history.

(56) References Cited

U.S. PATENT DOCUMENTS

| | | | | |
|---|---|---|---|---|
| 5,161,422 A | * | 11/1992 | Suman et al. | 74/335 |
| 5,365,803 A | * | 11/1994 | Kelley et al. | 74/484 R |
| 5,865,705 A | | 2/1999 | Shamoto et al. | |
| 6,532,841 B2 | | 3/2003 | Medico et al. | |
| 7,278,510 B1 | | 10/2007 | Richards | |
| 7,845,457 B2 | * | 12/2010 | Baluch et al. | 180/336 |
| 2009/0194398 A1 | | 8/2009 | Rykaert et al. | |
| 2009/0218160 A1 | | 9/2009 | Baluch et al. | |
| 2009/0270223 A1 | | 10/2009 | Cook | |

* cited by examiner

*Primary Examiner* — William C Joyce
(74) *Attorney, Agent, or Firm* — Fay Sharpe LLP

(57) ABSTRACT

A shift mode system and method of operating includes a switch assembly that selectively and alternately connects a shift selector to one of the steering column and the steering wheel. In an exemplary embodiment, the switch assembly has a first locking member to connect the shift selector to the steering column, and a second locking member for connecting the shift selector to the steering wheel. A lever has first and second operative positions to selectively engage the first and second locking members or pins from the shifter into operative engagement with one of first and second cable reels, respectively.

20 Claims, 6 Drawing Sheets

DRIVER SELECT PADDLE SHIFT DEVICE AND MODES OF OPERATION

BACKGROUND

The present disclosure relates to a gear selector device for an automatic transmission, and more particularly to driver select paddle shift devices and selective modes of operation.

It is generally known to provide automotive vehicles that have an automatic transmission with shift selector devices that allow the driver to select gears or shift gears of the automatic transmission. The selector devices are often paddle shifters (usually a pair of paddle shifters) that are typically provided to effect switching operation between gear ratios. In one option, the paddle shifters are mounted behind the steering wheel. The paddle shifters are mounted in the column cover and do not turn with the steering wheel. In a turn, a driver has to let go of the steering wheel in order to use the paddle shifters. In a sharp turn, most drivers prefer to have two hands on the wheel at all times. Thus, column mounted shifters are often very large because the shifters need to be easily accessible by the driver at any steering angle. Due to the size of the shifters, it becomes more difficult to use other column mounted devices such as turn signal indicators, wipers, bright light actuators, etc.

In other known arrangements, the paddle shifters are mounted behind the steering wheel and intended to move with the steering wheel. This mounting arrangement allows the driver to keep both hands on the steering wheel at all times. However, drivers note that confusion could potentially result because of the orientation of the shifters in a hand-over-hand turn. Since the location of the paddle shifters changes relative to the driver as the wheel is turned, there may be some hesitation or confusion on behalf of the driver in determining whether the correct shifter to use is either shifting up or down.

As will be appreciated, the vehicle is provided with a paddle shifter that either does not turn with the steering wheel, or with a version where the shifters move with the steering wheel. The driver is not provided the option of one arrangement versus the other, and yet the driver may have a preference of one option over the other.

Thus, a need exists for driver select shifters or a shift mode system that overcomes the above noted problems and others in a manner that is inexpensive, reliable, and easy to implement.

SUMMARY

A shift mode system and method of selectively switching operation of a shift selector are provided.

A preferred shift mode system includes a steering column, a steering wheel rotatably secured to the steering column, a shift selector (paddle switch device), and a selectable switch assembly for alternately connecting the shift selector to one of the steering column and the steering wheel.

The switch assembly preferably has a first locking member for connecting the shift selector to the steering column, and a second locking connector for connecting the shift selector to the steering wheel.

The switch assembly includes a housing interposed between the steering wheel and the steering column.

The first locking member selectively interconnects the housing and the steering column, and prevents selective rotation of the housing relative to the steering column.

The second locking member interconnects the housing and the steering wheel wherein the shift selector rotates with the steering wheel.

The first and second locking members are interconnected such that only one of the first and second locking members is operatively connected to the steering wheel and the steering column at one time.

In an exemplary embodiment, the first and second locking members are first and second pins that selectively extend from opposite ends of a shifter housing.

The shifter housing is axially interposed between the steering wheel and the steering column, and a lever has first and second operative positions for selectively axially extending the first and second pins from the shifter housing for operative connection with the steering wheel and steering column, respectively.

A method of selectively switching a shift selector for operative rotation with a steering wheel or being fixed to a steering column where the method includes mounting a switch between the steering wheel and the steering column and selectively switching the shift selector to move with the steering wheel or stay fixed relative to the column.

The method further includes moving a lever between first and second operative positions for selectively connecting the shift selector to the steering wheel and steering column.

The method includes mounting a paddle shifter housing unit between the steering column cover and the steering wheel.

The method further includes providing a first cable reel mounted for rotation with the steering wheel and mounting a second cable reel to the steering column.

The method includes positioning the lever in a first position so that locking members engage the paddle shifter housing unit for rotation with the first cable reel and actuating the lever in a second position so that the paddle shifter housing unit is alternately connected to the second cable reel.

A primary benefit of the present disclosure is the ability to let the driver select a type of paddle shift operation.

Another benefit is the ability to maintain the shifters of a size that is easily accessible by the driver.

Still another advantage is incorporating the shifters without negatively impacting operation of other column mounted devices.

Still other benefits and advantages of the present disclosure will become apparent upon reading and understanding the following detailed description.

DETAILED DESCRIPTION

Figure 1:
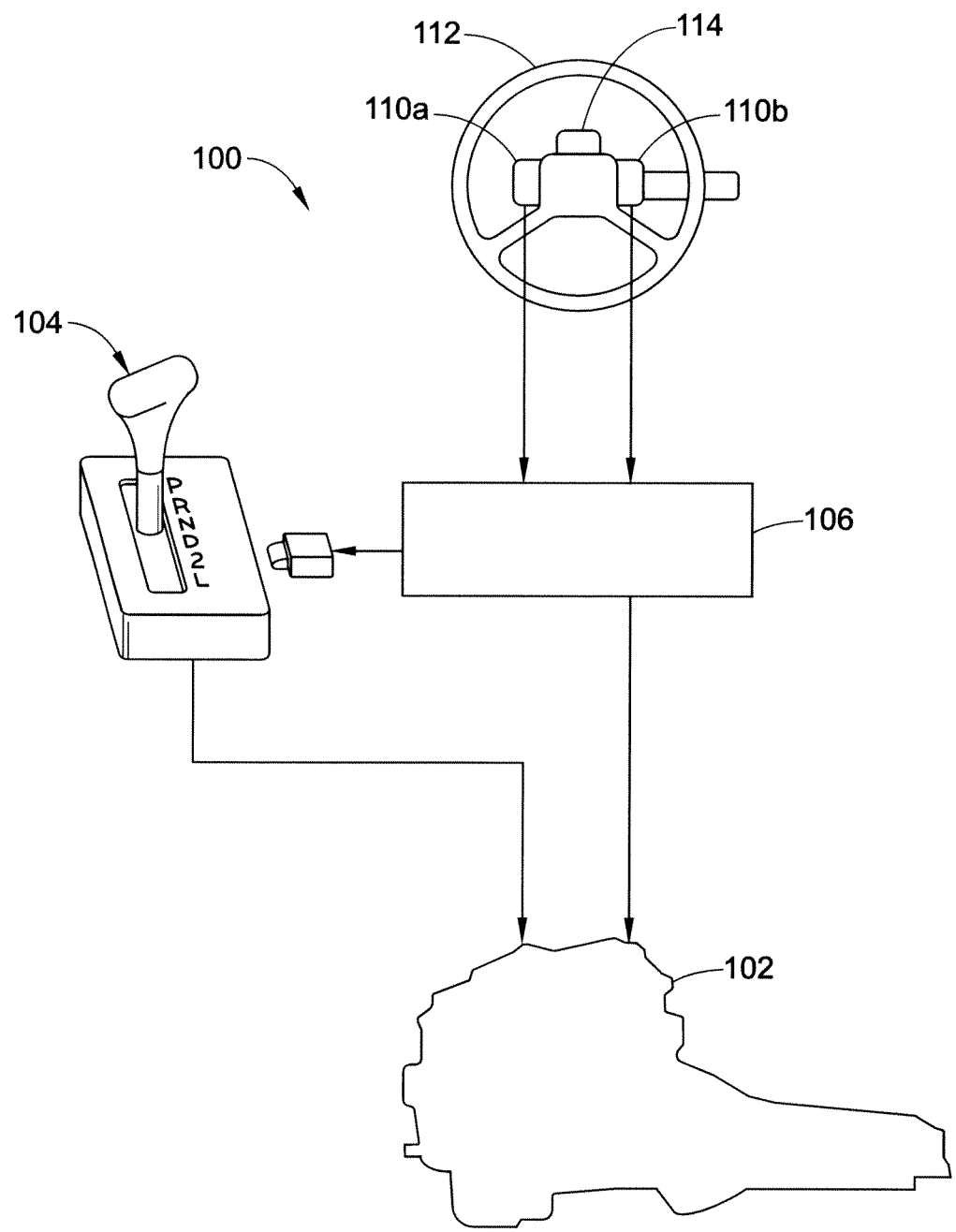
FIG. 1 is a schematic representation of a shift mode system used with an automatic transmission of an automotive vehicle.

Turning initially to FIG. 1, a shift mode system 100 for an automotive vehicle is generally illustrated. More particularly, automatic transmission 102 is connected to a shift lever 104 that allows the vehicle operator or driver to select any one of automatic shift ranges, "park", "neutral", "drive", "first or low gear", "second or high gear". Oftentimes, this shift lever 104 is positioned on the steering column, or alternatively on the floor of the vehicle. A shift control unit 106 is active when the shift lever 104 is in the drive mode, for example, and cooperates with a shift selector or paddle shift 110. Oftentimes, a pair of paddle shifters 110a, 110b are provided, one allowing the driver to shift "up", and the other to shift "down". As referenced in the Background, in prior art arrangements the paddle shifters 110a, 110b are either mounted for movement with the steering wheel 112 or mounted in a steering column cover 114 and remain stationary with the steering column, and thus do not turn with steering wheel 112.

Figure 2:
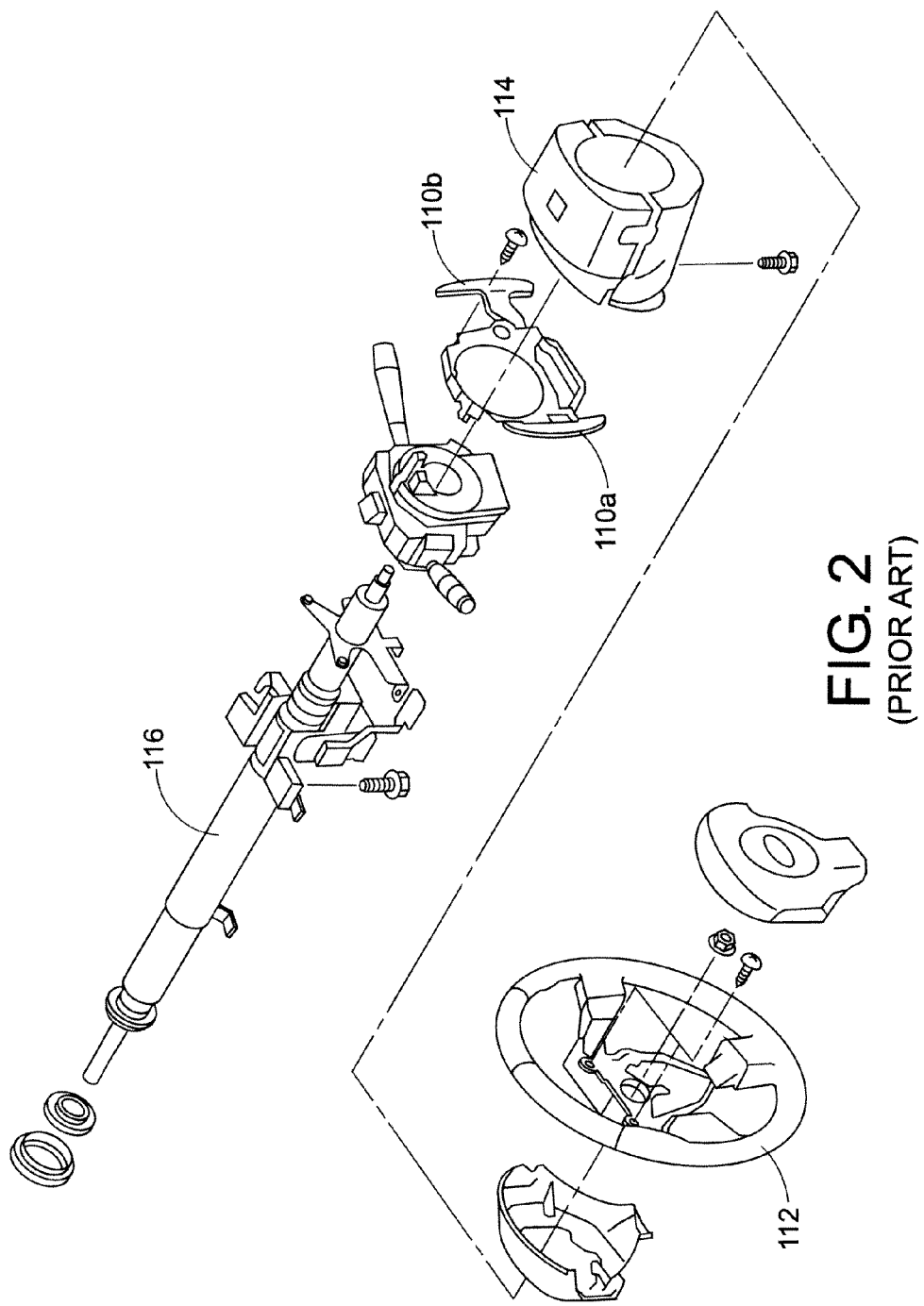
FIG. 2 shows a prior art arrangement of a paddle shifter mounted in the column cover that does not turn with the steering wheel.
Figure 3:
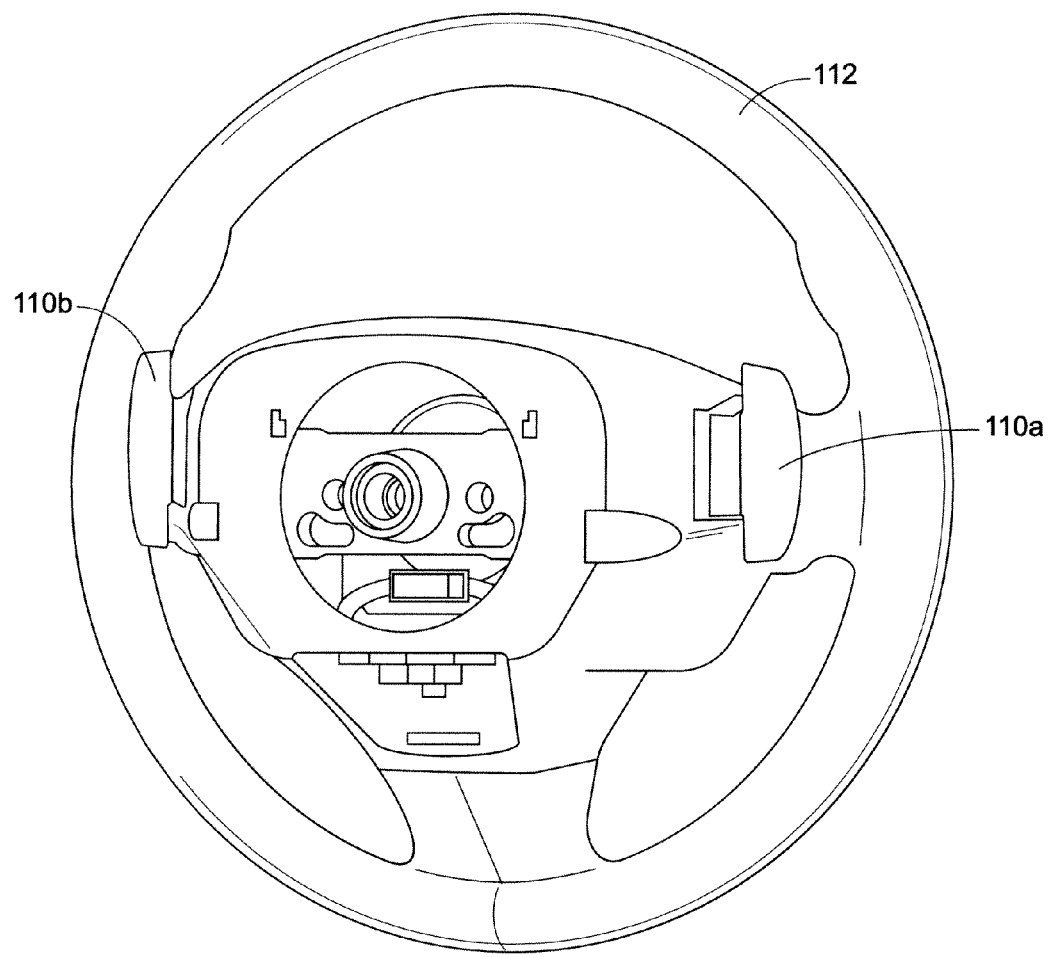
FIG. 3 is an alternative prior art arrangement that mounts the paddle shifters for rotation with the steering wheel.

These alternative paddle shift arrangements are generally illustrated in FIGS. 2 and 3. In the arrangement of FIG. 2, the paddle shifters 110a, 110b are mounted to a steering column cover 114. In this way, the paddle shifters to do not turn with the steering wheel 112. Therefore, although the steering wheel 112 selectively rotates steering shaft 116 to selectively turn the vehicle left and right, in this arrangement the paddle shifters 110 remain stationary as the steering wheel 112 is turned.

In the prior art arrangement of FIG. 3, it is evident that the paddle shifters 110a, 110b are secured to the steering wheel 112. That is, the paddle shifters 110a, 110b move with the steering wheel 112. It is also evident that the paddle shifters remain relatively close to the hands of the driver on the steering wheel to allow easy access to the paddle shifters. Therefore, current designs either provide the arrangement of FIG. 2 or FIG. 3.

Figure 4:
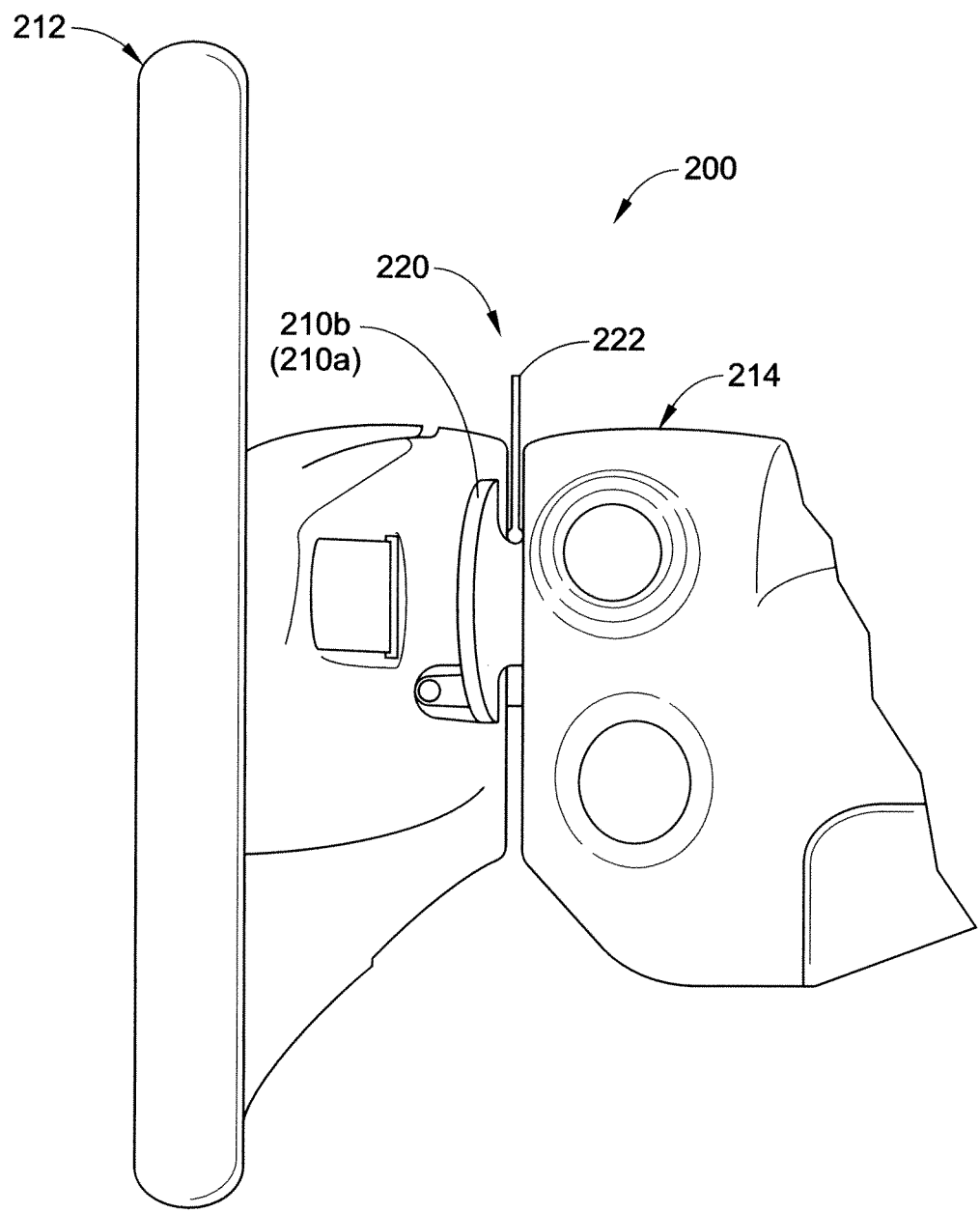
FIG. 4 is an elevational view of the shift mode system of the present disclosure.

An exemplary embodiment of shift mode system 200 the present disclosure is shown in FIG. 4 where like reference numerals identify like components in the 200 series (e.g., steering wheel 112 of FIGS. 1-3 is now identified as steering wheel 212, etc.) in which the shift selector or paddle shifters 210a, 210b are located between a steering wheel 212 and a steering column 214. Although a single shift selector could be employed, it is preferred that a pair of shift selectors or paddle shifters 210a, 210b are provided in the shift mode system 200, typically the paddle shifters being located at generally diametrically opposite locations relative to the steering column. Further, the paddle shifters 210a, 210b extend toward the steering wheel 212 (FIG. 4) so that they can be easily accessed by the driver's hands during a driving situation. A switch assembly 220 selectively and alternately connects the paddle shifters 210a, 210b to the steering wheel 212 and the steering column 214. More particularly, the switch assembly 220 includes a lever 222 that has first and second operative positions whereby the paddle shifters 210a, 210b are alternately and selectively mounted to the steering wheel and steering column, respectively.

Figure 5:
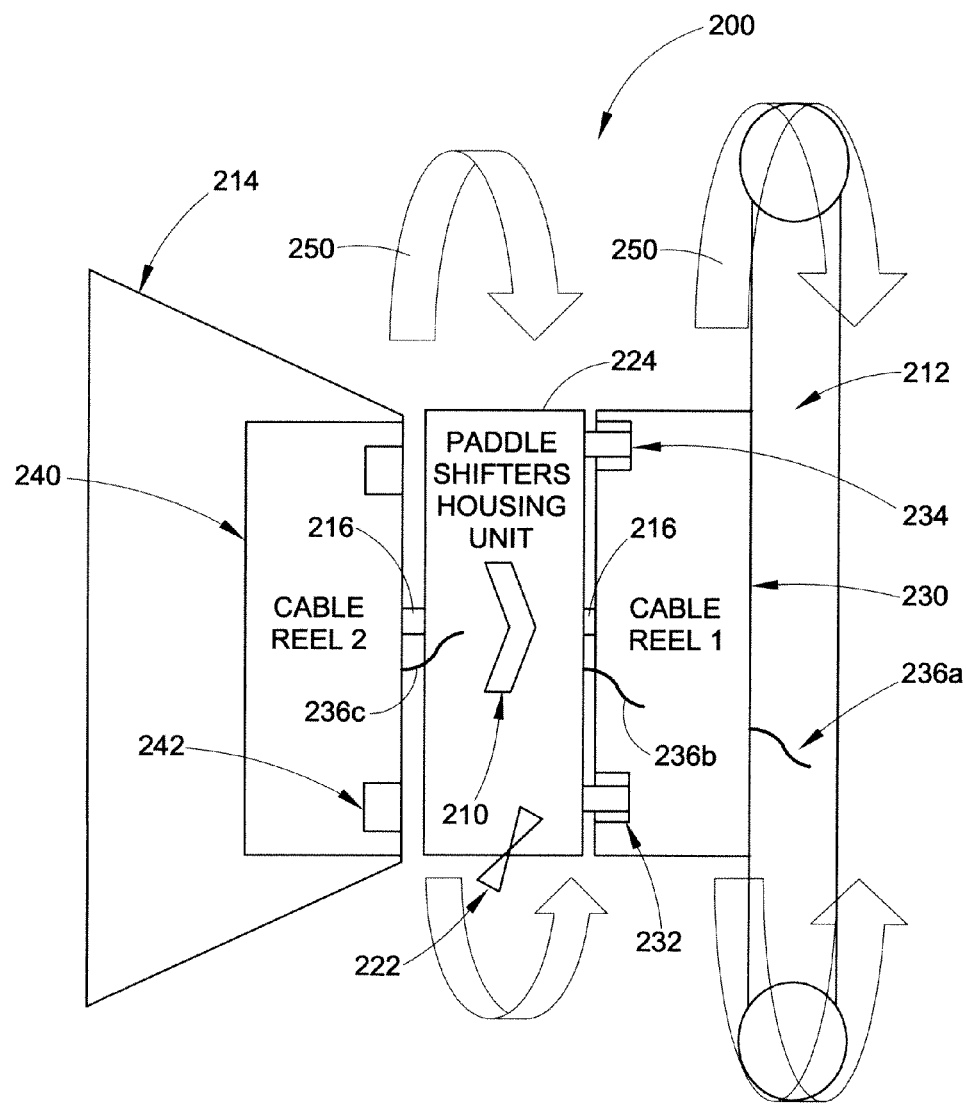
FIG. 5 schematically shows a paddle shifter housing unit in a first operative position where the paddle shifters rotate with the steering wheel.
Figure 6:
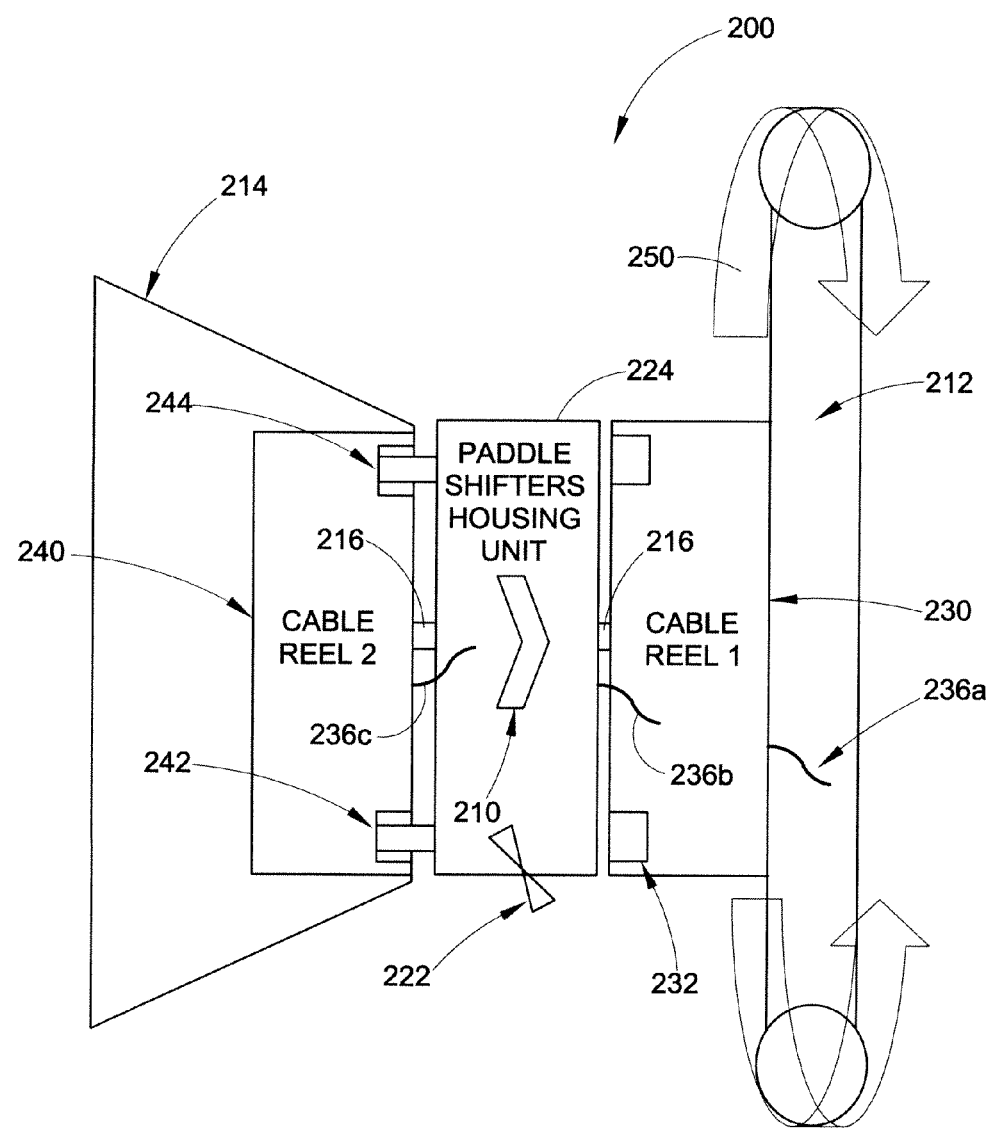
FIG. 6 is a schematic view of the paddle shifter housing unit in a second operative arrangement where the paddle shifters stay fixed relative to the steering column.

With continued reference to FIG. 4, and additional reference to FIGS. 5 and 6, an exemplary embodiment of one means of implementing the switch assembly 220 is shown and described in greater detail, although one skilled in the art will recognize that other structural arrangements may be used to switch or effect selective paddle shifter location (i.e., secured to the steering wheel or steering column) without departing from the scope and intent of the present disclosure. Moreover, the exemplary embodiment shown in FIGS. 4-6 is also deemed to be a simplified, reliable, and relatively inexpensive arrangement of incorporating the driver select paddle shift operation into an automotive vehicle. A paddle shifter housing 224 is mounted on the steering shaft 216. The paddle shifters 210 extend generally outward from the paddle shifter housing 224, one of the paddle shifters being illustrated in FIGS. 5 and 6, and it being understood by one skilled in the art that a second paddle shifter would extend outwardly from the housing at a generally diametrically opposite location. Actuator, switch, or selector lever 222 is mounted to the housing 224. The paddle shifter housing 224 is axially interposed between a first cable reel 230 mounted on the steering shaft 216 and secured for rotation or movement with the steering wheel 212. In addition, one or more slots 232 extend axially inward from one surface of the cable reel 230, namely that surface which faces the paddle shifter housing 224. The slot(s) 232 is dimensioned to receive a shifter locking pin(s) 234 that extends axially outward from the paddle shifter housing 224 in a first position of the selector lever 222. As will be appreciated, this receipt of the pin in the recess provides operative or mechanical engagement between the paddle shifter housing unit 224 and the first cable reel 230 (and likewise the steering wheel 212) so that that paddle shifters 210 carried on the housing rotate with movement of the steering wheel. Further, a wired connection (generally represented by reference numeral 236) extends from the first and second cable reels to complete the electrical connection among the components. More specifically, the first cable reel 230 preferably has two wires wherein the wire 236a connects to the steering wheel and is used for connection of any electrical controls the steering wheel may have, and wire 236b plugs into a connector clip (not shown) operatively associated with the paddle shifter housing 224. Similarly, wire connection 236c preferably extends from the second cable reel 240 to plug into a connector clip (not shown) operatively associated with the paddle shifter housing. Thus, by positioning the selector lever 222 in the first position, the paddle shifter housing unit 224 is engaged via first and second locking members (i.e., pins 234/slots 232) whereby the paddle shifters 210 rotate with the steering wheel 212 as also represented by the enlarged reference arrows 250.

In FIG. 6, a driver can select that the paddle shifters 210 stay fixed to the steering column 214. More particularly, the lever 222 is moved to a second operative position so that a second cable reel 240, which includes one or more slots 242 along a surface that faces the paddle shifter housing 224, receives locking members or pins 244. In a manner similar to the first cable reel 230, the second cable reel 240 is also mounted on the steering shaft 216, but is non-rotatably secured to the steering column 214 so that the steering shaft rotates relative to the second cable reel 240 and the steering column cover 214. In the second position of the lever 222, and with the pins 244 locking the paddle shifter housing 224 to the second cable reel 240, the paddle shifters 210 remain fixed to the steering column cover 214 and the steering wheel 212 rotates relative thereto.

One skilled in the art will appreciate that the paddle shifter housing 224 is in one of the first and second positions, and not both. That is, the lever 22 will have a biased over-center position so that either the pins 234 engage the first cable reel 230, or the pins 244 engage the second cable reel 240. The lever 222 may be within reach of the hands of the driver in much the same way that the paddle shifters 210 are so that the lever can also be easily accessed by the hands of the driver.

The disclosure has been described with reference to the preferred embodiment. Obviously, modifications and alterations will occur to others upon reading and understanding the preceding detailed description. It is intended that the disclosure be construed as including all such modifications and alterations in so far as they come within the scope of the appended claims or the equivalents thereof.

It is now claimed:

1. A shift mode system comprising:
   a steering column;
   a steering wheel rotatably secured to the steering column;
   a shift selector; and
   a selectable switch assembly for alternately connecting the shift selector to one of the steering column and the steering wheel.

2. The shift mode system of claim 1 wherein the switch assembly has a first locking member for connecting the shift selector to the steering column and a second locking member for connecting the shift selector to the steering wheel.

3. The shift mode system of claim 2 wherein the switch assembly includes a housing interposed between the steering wheel and the steering column.

4. The shift mode system of claim 3 wherein the first locking member includes at least one member for interconnecting the housing and the steering column and preventing selective rotation of the housing relative to the steering column.

5. The shift mode system of claim 4 wherein the second locking member includes at least one member for interconnecting the housing and the steering wheel wherein the shift selector rotates with the steering wheel.

6. The shift mode system of claim 2 wherein the first and second locking members are interconnected such that only one of the first and second locking members is operatively connected to steering wheel and the steering column at one time.

7. The shift mode system of claim 6 wherein the first and second locking members are first and second members, respectively, that selectively extend from opposite ends of a shifter housing.

8. The shift mode system of claim 7 wherein the shifter housing is axially interposed between the steering wheel and the steering column.

9. The shift mode system of claim 8 further comprising a lever having first and second operative positions for selectively extending first and second pins axially from the shifter housing for operative connection with the steering wheel and steering column, respectively.

10. The shift mode system of claim 9 wherein the steering wheel and steering column each include a recess for receiving one of the first and second members.

11. A paddle shift device for an automotive vehicle having a steering wheel and steering column mounted on a steering shaft, the paddle shift device comprising:
    a paddle shifter unit received on a steering shaft;
    a selector for selectively and alternately connecting the paddle shifter unit to one of the steering wheel and steering column; and
    at least one shifter mounted on the paddle shifter unit for selectively shifting gear ratios of the automotive vehicle.

12. The paddle shift device of claim 11 further comprising a locking arrangement that selectively interconnects the paddle shifter unit to only one of the steering wheel and steering column depending on the position of the selector.

13. The paddle shift device of claim 12 wherein the locking arrangement includes a first locking member that selectively interconnects the paddle shifter unit to the steering wheel in a first position of the selector, and a second locking member that selectively interconnects the paddle shifter unit to the steering column in a second position of the selector.

14. The paddle shift device of claim 11 further comprising a first cable reel operatively engaging the steering wheel and rotating therewith, and a second cable reel operatively engaging the steering column, the first and second cable reels disposed on opposite axial ends of the paddle shifter unit.

15. The paddle shift device of claim 11 further comprising a first locking member that selectively interconnects the paddle shifter unit to the steering wheel in a first position of the selector, and a second locking member that selectively interconnects the paddle shifter unit to the steering column in a second position of the selector.

16. A method of selectively switching operation of a shift selector comprising:
    providing a shift selector operatively associated with a steering column and a steering wheel where the steering wheel is movable relative to the steering column;
    providing a selectable switch assembly; and
    the selectable switch assembly alternately connecting the shift selector to one of the steering column and the steering wheel.

17. The method of claim 16 further comprising selectively locking the shaft selector in the connecting step to rotate with the steering wheel or remain stationary with the steering column.

18. The method of claim 17 wherein the locking step includes interconnecting only one of first and second locking members to the steering wheel and the steering column at one time.

19. The method of claim 16 further comprising mounting the shift selector between the steering wheel and the steering column.

20. The method of claim 16 wherein the shift selector providing step includes mounting a housing at an axial location between the steering wheel and steering column, positioning a selector on the housing, and securing at least one paddle shifter on the housing.

* * * * *